(12) United States Patent
Baek et al.

(10) Patent No.: US 8,865,852 B2
(45) Date of Patent: Oct. 21, 2014

(54) SILOXANE-BASED LOW DIELECTRIC CONSTANT THIN FILMS USING CYCLO-SILOXANE AND A METHOD FOR PREPARING THE SAME

(75) Inventors: Kyung Youl Baek, Seoul (KR); Seung Sang Hwang, Seoul (KR); Seung-Sock Choi, Seoul (KR); Sungyoun Oh, Seoul (KR); He Seung Lee, Seoul (KR); Eun Kyeong Kim, Seoul (KR)

(73) Assignee: Korea Institute of Science and Technology (KR)

( * ) Notice: Subject to any disclaimer, the term of this patent is extended or adjusted under 35 U.S.C. 154(b) by 536 days.

(21) Appl. No.: 12/909,554

(22) Filed: Oct. 21, 2010

(65) Prior Publication Data

US 2012/0004368 A1 Jan. 5, 2012

(30) Foreign Application Priority Data

Jul. 5, 2010 (KR) .................. 10-2010-0064332

(51) Int. Cl.
 *C08G 77/04* (2006.01)
 *C08L 83/06* (2006.01)
 *C08G 77/16* (2006.01)

(52) U.S. Cl.
 CPC ............. *C08L 83/06* (2013.01); *C08G 77/16* (2013.01)
 USPC .......................................... 528/37

(58) Field of Classification Search
 USPC ..................................... 528/37, 34
 See application file for complete search history.

(56) References Cited

U.S. PATENT DOCUMENTS

| | | | |
|---|---|---|---|
| 3,615,272 A | 10/1971 | Collins et al. | |
| 4,399,266 A | 8/1983 | Matsumura et al. | |
| 4,756,977 A | 7/1988 | Haluska et al. | |
| 4,999,397 A | 3/1991 | Weiss et al. | |
| 5,010,159 A | 4/1991 | Bank et al. | |
| 5,853,808 A | 12/1998 | Arkles et al. | |
| 6,000,339 A | 12/1999 | Matsuzawa | |
| 2006/0115658 A1* | 6/2006 | Mah et al. | 428/447 |

FOREIGN PATENT DOCUMENTS

EP 0997497 5/2000

* cited by examiner

*Primary Examiner* — Kuo-Liang Peng
(74) *Attorney, Agent, or Firm* — Cantor Colburn LLP

(57) ABSTRACT

A low-dielectric constant thin film prepared from a silsesquioxane polymer matrix as a precursor and a method for preparing the same which comprises preparing silsesquioxane sol by adding a stereoisomer of a multi reactive cyclosiloxane to an alkoxysilane are provided. The low-dielectric-constant thin film retains a stable film state even at a curing temperature of −500° C. without being decomposed, a very uniform surface property with a low surface modulus, and a superior coatability as to be coatable smoothly with no crack even with a thickness of 500 nm or larger.

12 Claims, 9 Drawing Sheets

²⁹Si-NMR of MT3ES7

(a) E and k value of various MT4-MS products
(b) H(hardness) and E(modulus) values of MT4MS37.

Surface image and roughness by nanoindenter microscope (MT4MS37 sample)

SILOXANE-BASED LOW DIELECTRIC CONSTANT THIN FILMS USING CYCLO-SILOXANE AND A METHOD FOR PREPARING THE SAME

CROSS-REFERENCE TO RELATED APPLICATION

This application claims priority to Korean Patent Application No. 10-2010-0064332, filed on Jul. 5, 2010, and all the benefits accruing therefrom under 35 U.S.C. §119, the contents of which in its entirety are herein incorporated by reference.

BACKGROUND

1. Field

The present disclosure relates to a low-dielectric-constant thin film prepared to have high surface modulus and low dielectric properties and a method for preparing the same. More particularly, the disclosure relates to a low-dielectric-constant thin film having high strength and low dielectric properties as well as good thermal stability prepared by adding a multireactive cyclic silsesquioxane material when preparing a siloxane-based polymer matrix, and a method for preparing the same.

2. Description of the Related Art

As semiconductors are more and more integrated, decrease in signal transfer rate caused by increased RC delay in the wirings is becoming a serious problem. Thus, it is a major concern to reduce capacitance of interlayer dielectric thin films.

In this regard, U.S. Pat. Nos. 3,615,272, 4,399,266, 4,756,977 and 4,999,397 disclose polysilsesquioxane dielectric films (dielectric constant=about 2.5 to 3.1) that can be produced by the spin-on deposition (SOD) method instead of $SiO_2$ dielectric films (dielectric constant=4.0) requiring chemical vapor deposition.

Also, hydrogen silsesquioxane and various preparation processes thereof are known in the art. For example, U.S. Pat. Nos. and 3,615,272 and 5,010,159 silicone resin compositions produced by hydrolysis and condensation using acid or base. U.S. Pat. No. 6,000,339 discloses a process for producing a silica-based material enabling thick layer formation and having improved oxygen plasma resistance and other physical properties. U.S. Pat. No. 5,853,808 discloses siloxane- and silsesquioxane-based polymers prepared from an organosilane compound having a reactive group substituted at the β-position in order to obtain an $SiO_2$-rich thin film and a coating composition using the same.

Further, European Patent No. 0997497 A1 discloses compositions obtained by hydrolysis and condensation of various alkoxysilane compounds, including monoalkoxysilanes, dialkoxysilanes, trialkoxysilanes, tetraalkoxysilanes and trialkoxysilane dimers and mixtures thereof, and dielectric films produced using the same.

However, the dielectric thin films produced using the siloxane-based polymers prepared according to known methods do not provide a sufficiently low dielectric constant (2.7 or lower). In case a sufficiently low dielectric constant is provided, mechanical property is not good (film modulus≤3 GPa) and the content of organic carbon in the dielectric film is high. Although the polymers prepared from silicon compounds having Q structure such as tetramethoxysilane (TMOS) have good mechanical property, they have too high an $SiO_2$ content. Thus, the dielectric constant tends to be very high because of high hygroscopy, which makes them inapplicable to low-dielectric-constant thin films (especially, low-dielectric-constant thin films prepared by the SOD process).

In addition, siloxane-based polymers having good compatibility with pore-forming materials, which are used together to provide a lower dielectric constant, are required recently.

Accordingly, a material for forming a low-dielectric-constant thin film that can be produced by the SOD process which has a low dielectric constant, superior tensile strength and other mechanical properties and excellent compatibility with pore-forming materials, is needed in the related art.

SUMMARY

The inventors have realized that a multireactive cyclosiloxane compound having a specific structure has good reactivity and is capable of easily forming a cured structure modifiable during polymerization. They have also confirmed that a siloxane polymer (co)polymerized from different siloxane or silane-based monomers has excellent mechanical property, thermal stability, crack resistance, or the like as well as superior compatibility with existing pore-forming materials, has a low dielectric constant since the hygroscopy can be maintained in a low level depending on the hydrophilicity of organic functional groups even under a spin-on glass (SOG) process, is capable of maintaining a low carbon content, and can be designed to have a high siloxane linkage content with a relative low $SiO_2$ content.

If combined with superior thermal stability and low dielectric property characteristic of the siloxane bonding, the improved physical properties such as film strength and crack resistance will allow the preparation of superior low-dielectric-constant thin films as compared to existing techniques.

In the present disclosure, multireactive cyclosiloxane monomers are added when polymerizing a siloxane-based material having low dielectric property in order to maximize film strength and minimize the dielectric constant. Thus, the present disclosure is directed to providing a multireactive siloxane compound capable of allowing the preparation of a low-dielectric-constant thin film having superior mechanical property, thermal stability, low dielectric property and crack resistance, a silsesquioxane sol (siloxane-based (co)polymer) prepared by adding the same, and a method for preparing a low-dielectric-constant thin film using the same.

In one aspect, there is provided a low-dielectric-constant thin film prepared from a silsesquioxane polymer matrix as a precursor, the silsesquioxane polymer matrix being a silsesquioxane sol prepared by adding a multireactive cyclosiloxane to an alkoxysilane.

In another aspect, there is provided a method for preparing a low-dielectric-constant thin film, including: adding a stereoisomer of a multireactive cyclosiloxane to an alkoxysilane to prepare a silsesquioxane sol by a sol-gel method; preparing a coating solution containing the silsesquioxane sol and a solvent; and applying the coating solution on a substrate and curing the same.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
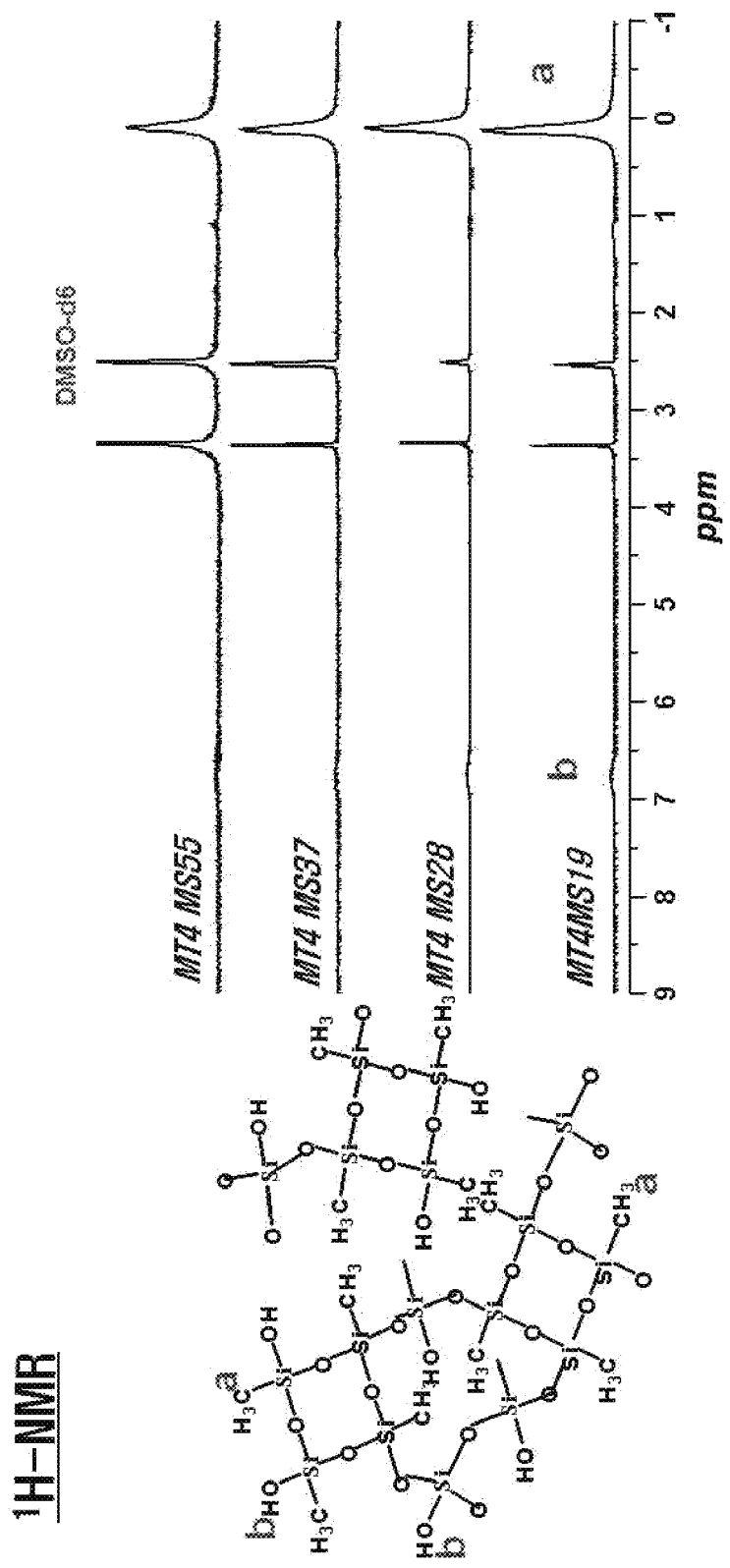
FIG. 1 shows $^1H$ NMR analysis result for confirming synthesis of a silsesquioxane matrix precursor used for preparation of a low-dielectric-constant thin film according to an embodiment of the present disclosure.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure provides a low-dielectric-constant thin film prepared from a highly reactive silsesquioxane matrix as a precursor. The silsesquioxane matrix is a silsesquioxane-based sol prepared by adding a cyclosiloxane monomer to an alkoxysilane monomer.

Although low-dielectric-constant thin films are used in various applications, physical properties such as low dielectric property and film strength still do not meet the desired requirements. In accordance with the present disclosure, a low-dielectric-constant thin film is prepared from a silsesquioxane sol which is prepared by adding a multireactive cyclosiloxane monomer to an alkoxysilane monomer, in order to maximize the strength and minimize the dielectric constant. That is to say, with the present disclosure is directed to providing a multireactive siloxane compound capable of allowing the preparation of a low-dielectric-constant thin film having superior mechanical property, thermal stability, low dielectric property and crack resistance, and a silsesquioxane sol (siloxane-based (co)polymer) prepared by adding the same.

Only with the addition of the cyclosiloxane, the dielectric constant can be reduced to 2.5 or lower during the curing process, without the need of using a pore-forming agent to induce pore formation. This may be due to the mesopores formed by the structure of the reactive cyclosiloxane. Although a high surface strength and a low dielectric constant may be attained without using a pore-forming agent, a pore-forming agent with good compatibility may be used for modification of physical properties through, for example, pore formation depending on occasions.

In an embodiment, the multireactive cyclosiloxane may be a polygonal cyclosiloxane formed as 3 to 12 siloxanes having hydroxyl groups are linked. Specifically, it may be tetramethyltetrahydroxy cyclotetrasiloxane having 4 methyl groups and 4 hydroxyl groups.

Any such cyclosiloxane may be used as a monomer to prepare the silsesquioxane sol without particular limitation. For example, it may be selected from various isomers occurring as the siloxane linkage is formed. Specifically, it may be one or more selected from a group consisting of trans-cis-trans cyclosiloxane (hereinafter "trans" isomer), cis-cis-trans cyclosiloxane (hereinafter, "random" isomer), trans-trans-trans cyclosiloxane (hereinafter, twist isomer) and a combination thereof.

As a specific example, the silsesquioxane matrix may be prepared using an alkoxysilane and a stereoisomer of a cyclosiloxane separated according to Scheme 1 as monomers.

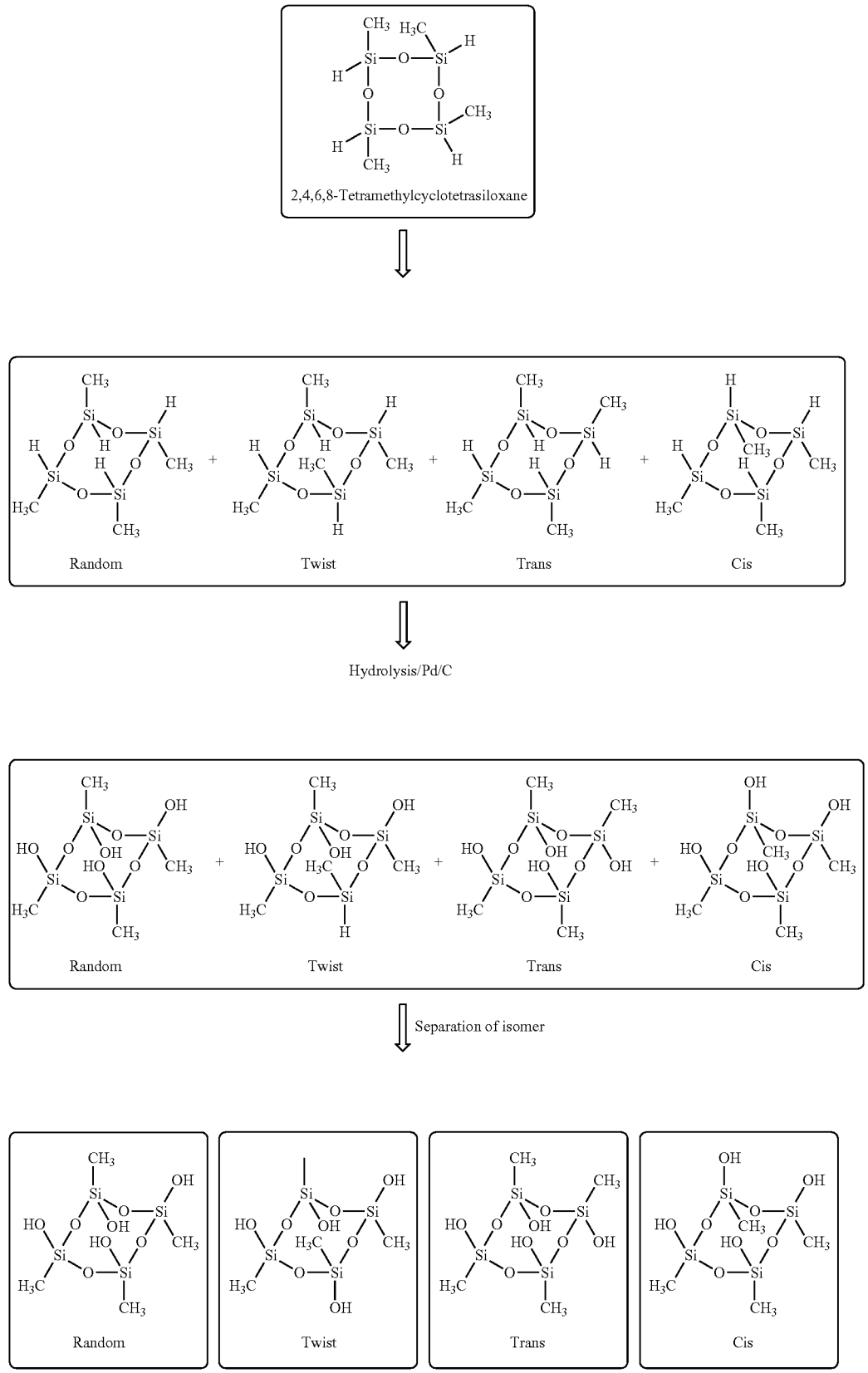
[Scheme 1]

The stereoisomers of the multireactive cyclosiloxane may have several configurations. However, to take a cyclosiloxane with 4-cyclic structure as an example, since cis-cis-cis cyclosiloxane (hereinafter, "cis" isomer) has an unstable structure at room temperature, the silsesquioxane sol may be prepared using trans, random and twist isomers or a combination thereof, except for the cis isomer. However, depending on situations, the cis isomer may be included in the polymerization to attain a desired physical property.

Specifically, the stereoisomer of the multireactive cyclosiloxane may be a combination of trans, random and twist isomers. The silsesquioxane sol may be prepared after separating out the cis isomer from the stereoisomers of the cyclosiloxane.

In an embodiment, the alkoxysilane monomer may be any one that can be used to prepare the silsesquioxane sol without particular limitation. Specifically, a monomer with a structure of a Chemical Formula I may be used, wherein $R_1$ is substituted or unsubstituted alkoxy, specifically ethoxy, $R_2$ is an n-alkyl substituted or unsubstituted aliphatic organic functional group, alkyl, aryl, vinyl, amine, acryl or halogen. Specifically, the n-alkyl may have 1 to 12 carbons, but is not limited thereto.

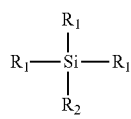

(1)

A molar ratio of the cyclosiloxane to the alkoxysilane may be determined depending on a desired property of the low-dielectric-constant thin film. For example, it may be from 1:9 to 9:1, specifically 2:8 to 8:2, more specifically 3:7 to 7:3, further more specifically 5:5, but is not limited thereto.

In this regard, the inventors have identified that a low-dielectric-constant thin film having superior film strength properties may be prepared when the molar ratio of the multireactive cyclosiloxane to the alkoxysilane is from 1:9 to 9:1.

In an embodiment, the silsesquioxane sol may be prepared from the alkoxysilane and the cyclosiloxane as monomers by a sol-gel method. For example, it may be prepared by a process including hydrolysis and condensation of the alkoxysilane and the cyclosiloxane. Thus prepared silsesquioxane sol may have a weight average molecular weight from 1,000 to 100,000, specifically from 1,000 to 20,000, and may be used to prepare a low-dielectric-constant thin film having desired properties.

The low-dielectric-constant thin film according to the present disclosure has such a superior coatability as to be coatable smoothly with no crack even with a thickness of 500 nm or larger and to give very uniform surface.

The present disclosure also provides a method for preparing a low-dielectric-constant thin film, comprising: adding a stereoisomer of a multireactive cyclosiloxane to an alkoxysilane to prepare a silsesquioxane sol by a sol-gel method; preparing a coating solution comprising the silsesquioxane sol and a solvent; and applying the coating solution on a substrate and curing the same.

First, a multireactive cyclosiloxane is added to an alkoxysilane to prepare a silsesquioxane sol by a sol-gel method.

The foregoing description about the alkoxysilane, the multireactive cyclosiloxane and the stereoisomers thereof also holds for the preparation of the low-dielectric-constant thin film.

In an embodiment, the method for preparing a low-dielectric-constant thin film according to the present disclosure may comprise hydrolysis and condensation as shown below. A highly reactive silsesquioxane polymer matrix may be prepared by a sol-gel method, and the prepared silsesquioxane polymer matrix may be used as a precursor for forming the low-dielectric-constant thin film.

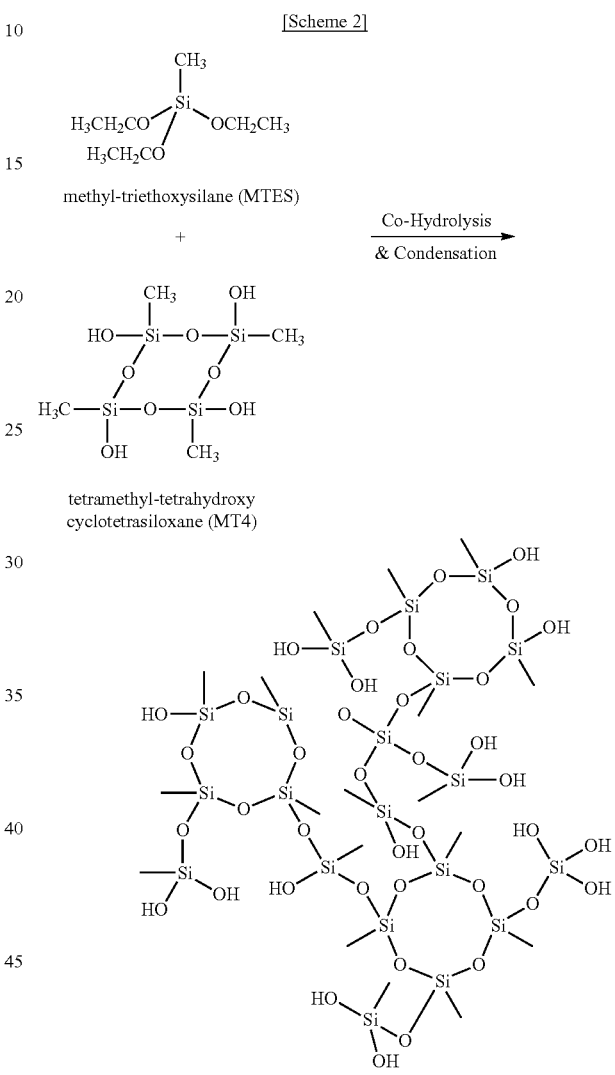

Depending on situations, the method may further comprise, after the preparation of the silsesquioxane sol, extracting the silsesquioxane sol using a solvent in order to remove an acid or base catalyst. The extraction solvent is not particularly limited. For example, one that is not mixed well with water and is capable of dissolving the reaction precursor well, such as diethyl ether, methyl chloride, chloroform, methyl isobutyl ketone or a mixture thereof, may be used. The organic solvent serves to dissolve the precursor and, with sufficiently different density from that of water, facilitate removal of the catalyst through phase separation.

Although the film shows no seemingly significant change in surface characteristics before and after the extraction, the extraction may be carried out for a stable synthesis of the reactive silsesquioxane sol precursor.

Then, a coating solution comprising the silsesquioxane sol and a solvent is prepared.

In an embodiment, the solvent may be one or more selected from a group consisting of methyl alcohol, ethyl alcohol, ispropyl alcohol, butyl alcohol, acetone, methyl ethyl ketone, ethylene glycol, tetrahydrofuran, dimethylformamide, dimethylacetamide, N-methyl-2-pyrrolidone, hexane, cyclohexanone, cyclohexane, toluene, xylene, chloroform, methyl isobutyl ketone, methylene chloride, chlorobenzene, dichlorobenzene, dimethylbenzene, trimethylbenzene, pyridine, triethylamine, methylnaphthalene, nitromethane, acrylonitrile, octadecylamine, aniline, dimethyl sulfoxide, benzyl alcohol, acetonitrile and dioxane, but is not limited thereto.

In an embodiment, the organic solvent be used to prepare the coating solution is not particularly limited. Any of the above organic solvents may be used. The solid content of the coating solution is not particularly limited, but it may be 0.1 to 80 wt %, specifically 5 to 70%, more specifically 5 to 30 wt %, based on the total weight of the coating solution. If the solid content is less than 0.1 wt %, the physical properties of the film may be not good since the film thickness becomes 10 Å or smaller.

Thereafter, the coating solution comprising the silsesquioxane sol and the solvent is applied on a substrate and then cured.

In an embodiment, the substrate may be any one that can endure a thermal curing condition without particular limitation. For example, a glass substrate, a silicon wafer, a plastic substrate, or the like may be selected depending on particular purposes. In an embodiment, the coating solution may be applied on the substrate by, for example, spin coating, dip coating, spray coating, flow coating or screen printing, without being limited thereto.

Specifically, spin coating may be employed in aspects of convenience and uniformity. When the coating solution is applied on the substrate by spin coating, a spinning rate may be from 100 to 10,000 rpm, specifically from 500 to 3000 rpm.

In an embodiment, the curing of the coated coating solution may be performed at room temperature (25° C.) to 750° C. for 5 minutes to 20 hours. For example, it may be carried out by increasing temperature from room temperature to 250° C., maintaining the temperature for several hours, maintaining temperature at 300° C. for several hours, and then maintaining temperature at 400° C. for several hours. Such a gradual curing may minimize the crack formation resulting from rapid temperature change of the film.

Thus prepared low-dielectric-constant thin film may exhibit a low dielectric constant of, for example 3.0 or lower, specifically 2.5 or lower, while exhibiting a high strength property of 3 GPa or larger, specifically 4.8 to 10 GPa.

EXAMPLES

The examples and experiments will now be described. The following examples and experiments are for illustrative purposes only and not intended to limit the scope of the present disclosure.

Example

Tetramethyl-tetrahydroxy cyclotetrasiloxane (MT-4) was dissolved in THF and, after adding methyltriethoxysilane (MTES) and water dropwise, added to 35 wt % HCl aqueous solution. After 43 hours of reaction, a multifunctional silica precursor was prepared through hydrolysis and condensation. A molar ratio of MTES to MT4 was 9:1, 8:2, 7:3 and 5:5. The reaction was carried out over 2 days, by maintaining temperature at 25° C. for 24 hours and then at 35° C. for 19 hours. After removing the organic solvent at 10° C. using a rotary evaporator, the reaction solution was extracted using diethyl ether and water. Measurement of acidity using a pH paper revealed that HCl was completely removed. Following the purification, water was removed using $MgSO_4$, and then diethyl ether was removed using a rotary evaporator. White powder was obtained.

Figure 2:
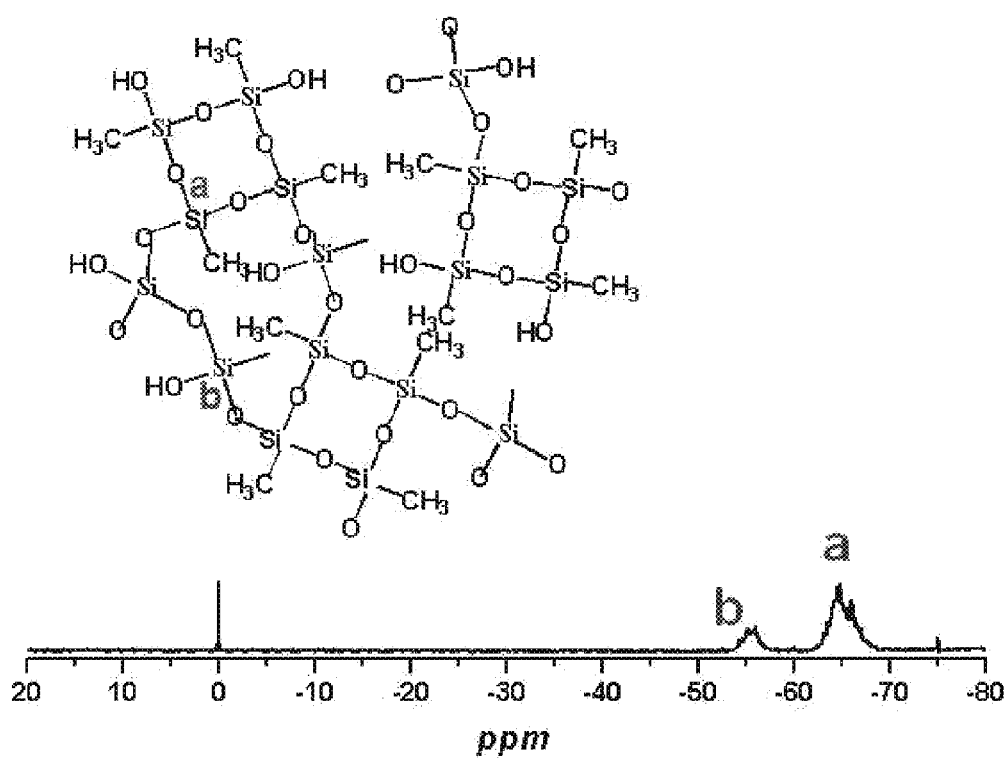
FIG. 2 shows $^{29}$Si NMR analysis result for confirming synthesis of a silsesquioxane matrix precursor used for preparation of a low-dielectric-constant thin film according to an embodiment of the present disclosure.
Figure 3:
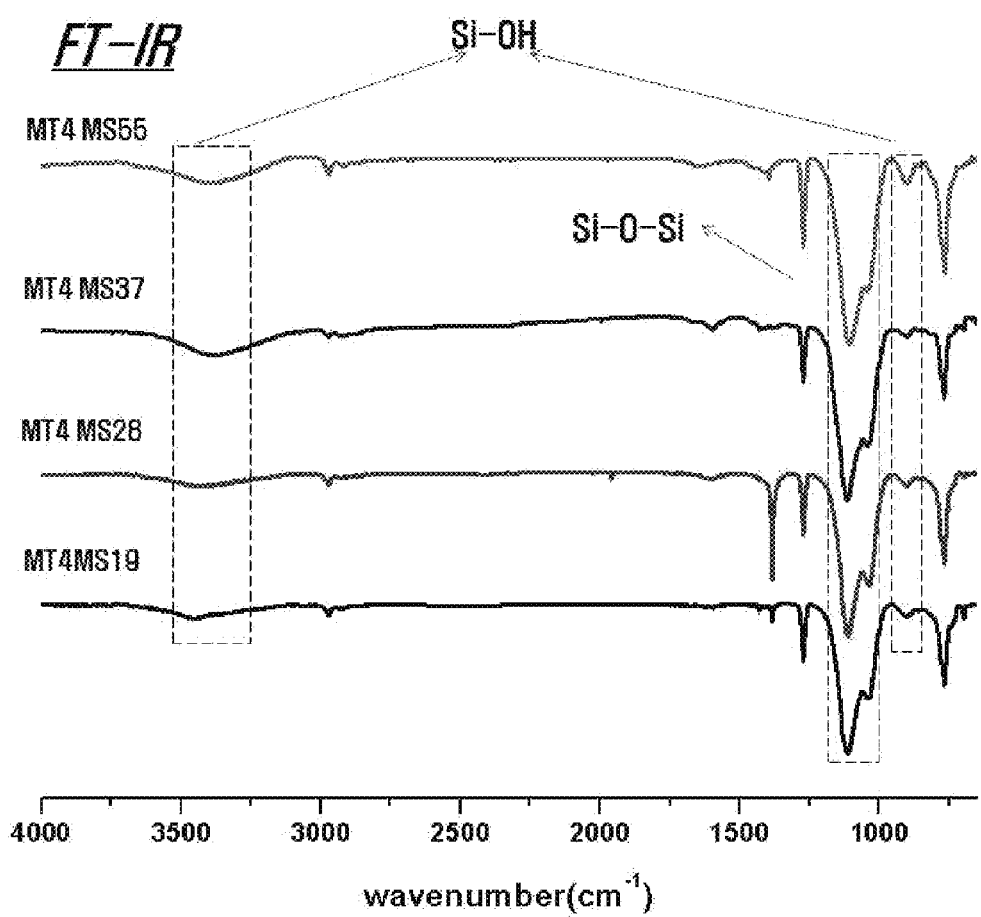
FIG. 3 shows FT-IR analysis result of a silsesquioxane matrix precursor used for preparation of a low-dielectric-constant thin film according to an embodiment of the present disclosure.
Figure 4:
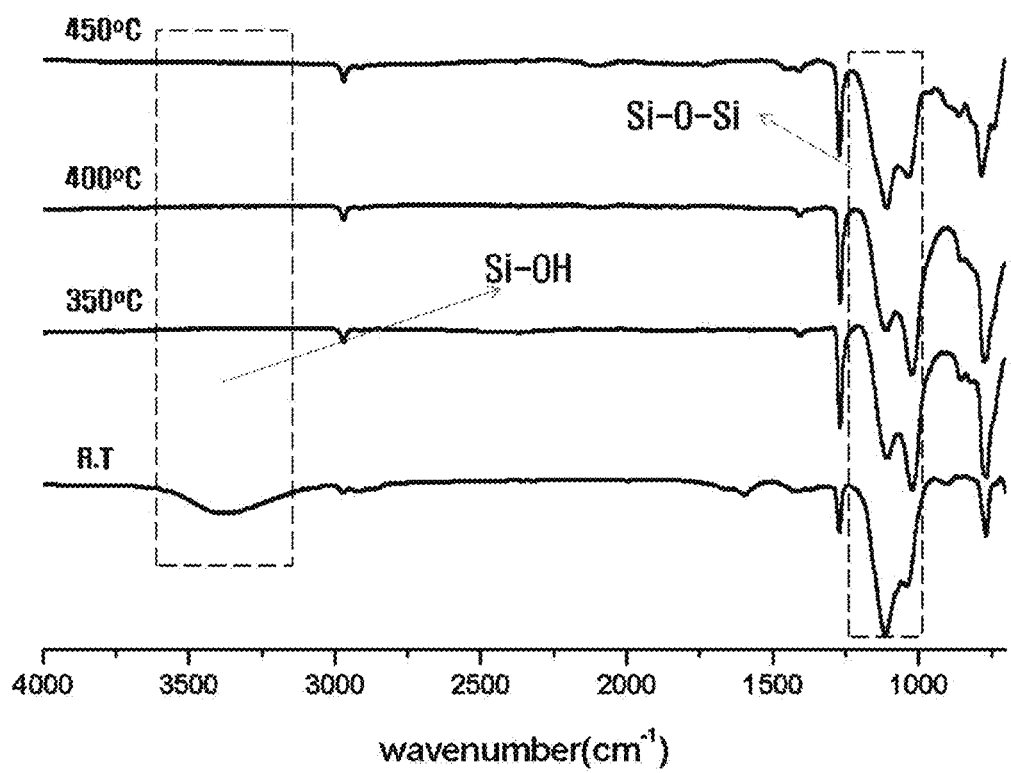
FIG. 4 shows FT-IR analysis result of a silsesquioxane matrix precursor used for preparation of a low-dielectric-constant thin film according to an embodiment of the present disclosure after heat treatment.

Thus synthesized precursor was analyzed. FIG. 1 shows $^1$H NMR spectra of MT4 MS series. It can be seen that the alkoxy group was substituted with the reactive group Si—OH through the hydrolysis (I.e., the ethoxy peak at 3.8 ppm disappeared). FIG. 2 shows a $^{29}$Si NMR spectrum of MT3ES7. T2 and T3 regions are observed. T2 content evaluated by integration was about 15%, suggesting a high surface modulus after curing. The reaction is also confirmed from the hydroxyl peaks of 3000-3500 $cm^{-1}$ in the FT-IR spectra of FIG. 3. As seen from FIG. 4, the hydroxyl groups disappeared after heat treatment at 350° C. or higher.

Test Example 1

Film Properties of Reactive Silsesquioxane Matrix

Film properties of the reactive silsesquioxane matrix prepared in Example 1 were analyzed.

TABLE 1

| MT4:MTES Ratio | Simplified name | Mw (g/mol) | PDI | Weight loss (TGA) 450 | 700 | OH % (calculated by TGA from 100° C. to 300° C.) |
|---|---|---|---|---|---|---|
| 1:9 | MT4MS19 | 8,043 | 8.57 | 86.5 | 86.4 | 13 |
| 2:8 | MT4MS28 | 13,000 | 9.76 | 86.9 | 86.3 | 12 |
| 3:7 | MT4MS37 | 8,784 | 4.18 | 90 | 89.4 | 9 |
| 5:5 | MT4MS55 | 5,028 | 3.12 | 89.4 | 88.7 | 10 |

Figure 5:
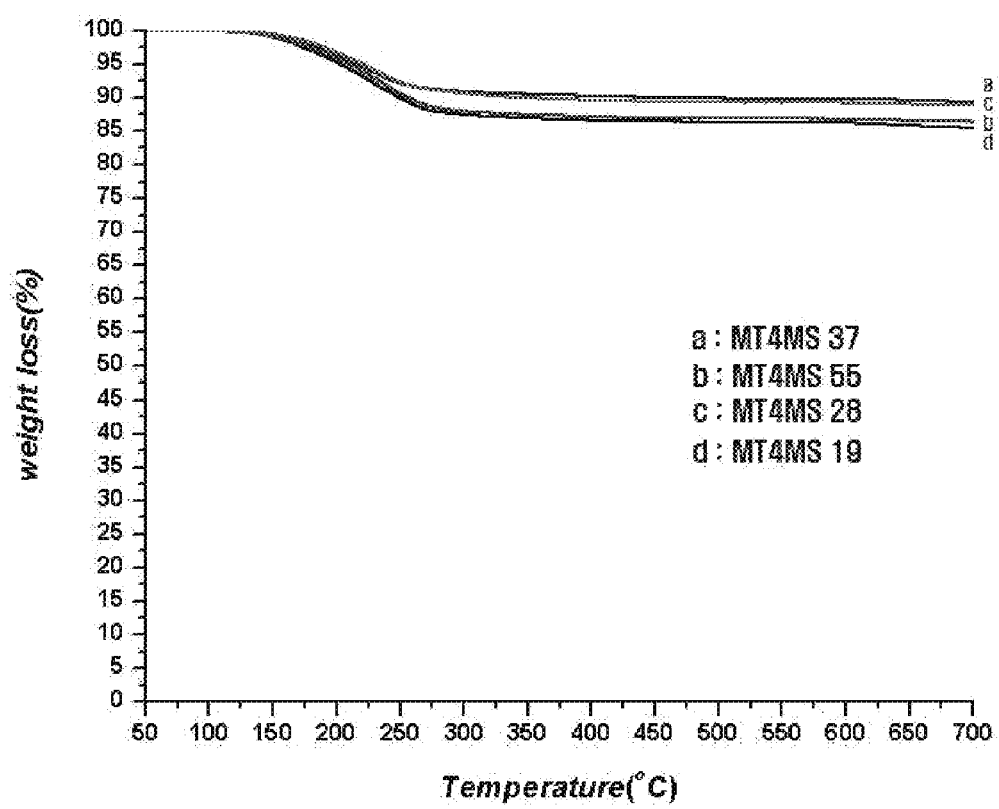
FIG. 5 shows thermal gravimetric analysis (TGA) result of a silsesquioxane matrix precursor used for preparation of a low-dielectric-constant thin film according to an embodiment of the present disclosure.

Thermogravimetric analysis (TGA) was performed to investigate curing temperature and thermal stability of the reactive precursor. The result is shown in FIG. 5. Referring to FIG. 5, the temperature at which weight loss occurred initially due to hydrolysis was set as the curing start temperature. Thereafter, the weight did not decrease significantly. Thus, the curing was performed by increasing temperature from room temperature to 250° C., maintaining the temperature for 2 hours, maintaining temperature at 300° C. for 1 hour, maintaining temperature at 400° C. for 1 hour, and then maintaining temperature at 450° C. for 1 hour. Such a gradual curing was to minimize the crack formation resulting from rapid temperature change of the film. After the curing, the film remained stable up to 700° C. without decomposition.

Test Example 2

Figure 6:
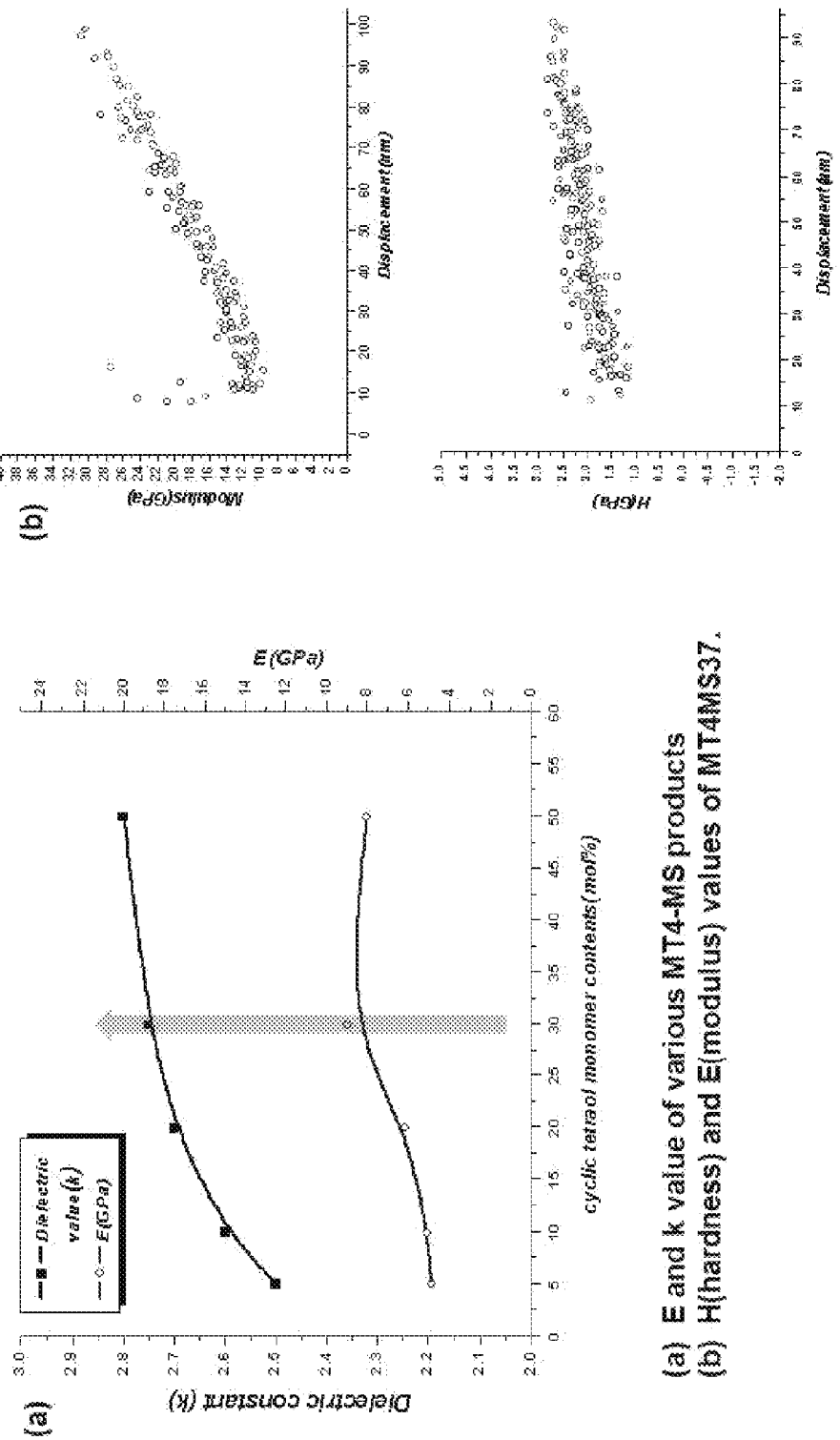
FIG. 6 shows a result of measuring dielectric constant and film strength of low-dielectric-constant thin films of Examples 1 to 4 (a) and film strength (modulus and hardness) of a low-dielectric-constant thin film of Example 3 (b)

After the curing, film properties were tested through nanoindentation, and the dielectric constant was measured using an HP 4192A impedance analyzer from 100 kHz to 1 MHz. A nanoindenter was used to measure surface modulus and hardness of the film. A sample for measuring the dielectric constant and electrical properties was prepared using a 20 wt % MIBK solution under the condition of 2500 rpm. It had a film thickness of 600-700 nm or larger, which was suitable to measure the dielectric constant and electrical properties. And, for measurement of breakdown voltage and other properties, a sample with a small film thickness of 50-60 nm was prepared using a 5 wt % MIBK solution under the condition of 1500-2500 rpm. Surface properties were measured while performing curing as described above. The result is shown in FIG. 6. The samples with MT4:MTES=1:9, 2:8, 3:7 and 5:5 respectively showed a modulus of 4.8 GPa, 5.2 GPa, 10 GPa and 8 GPa and a dielectric constant of k=2.45, k=2.6, k=2.7 and k=2.8. To conclude, all of them exhibited high strength and low dielectric property.

Test Example 3

Figure 7:
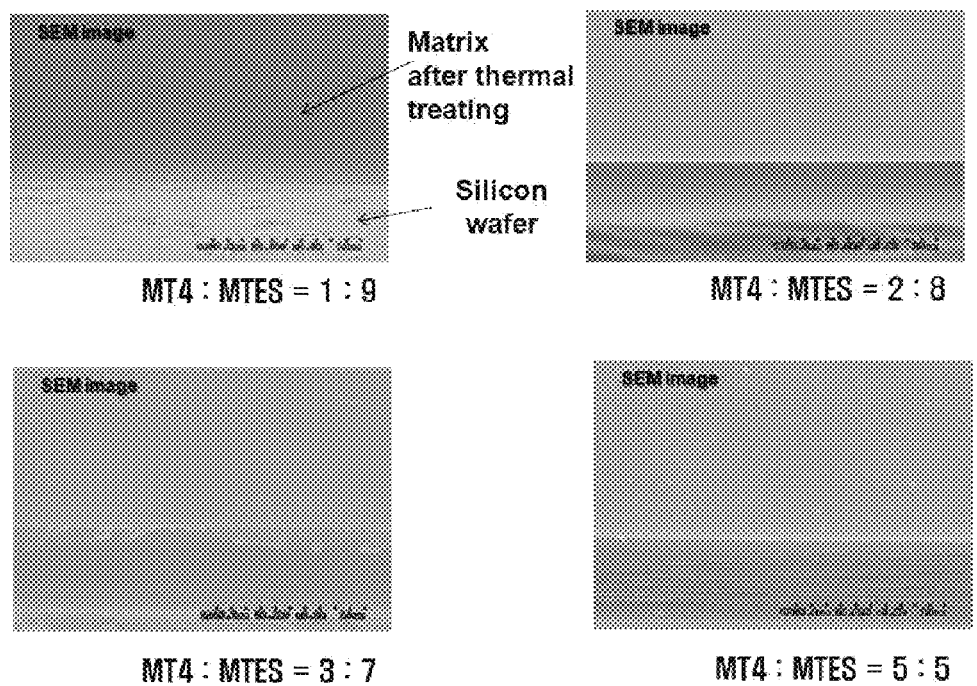
FIG. 7 shows cross-sectional images of low-dielectric-constant thin films of Examples 1 to 4 prepared by spin coating on a silicon wafer after heat treatment at 450° C.
Figure 8:
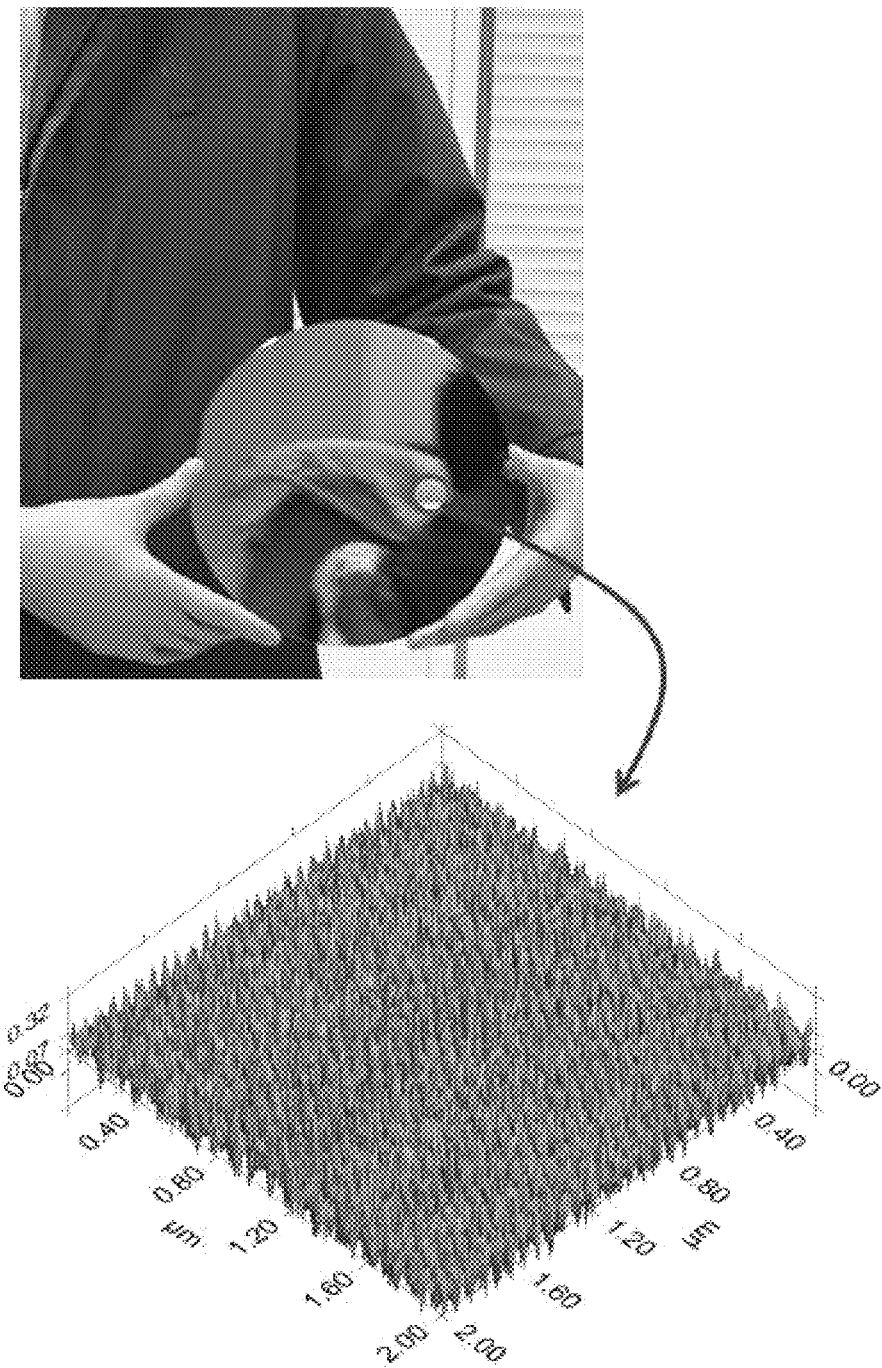
FIG. 8 shows a surface image of and a result of measuring surface roughness using a nanoindenter microscope of a low-dielectric-constant thin film according to an embodiment of the present disclosure.
Figure 9:
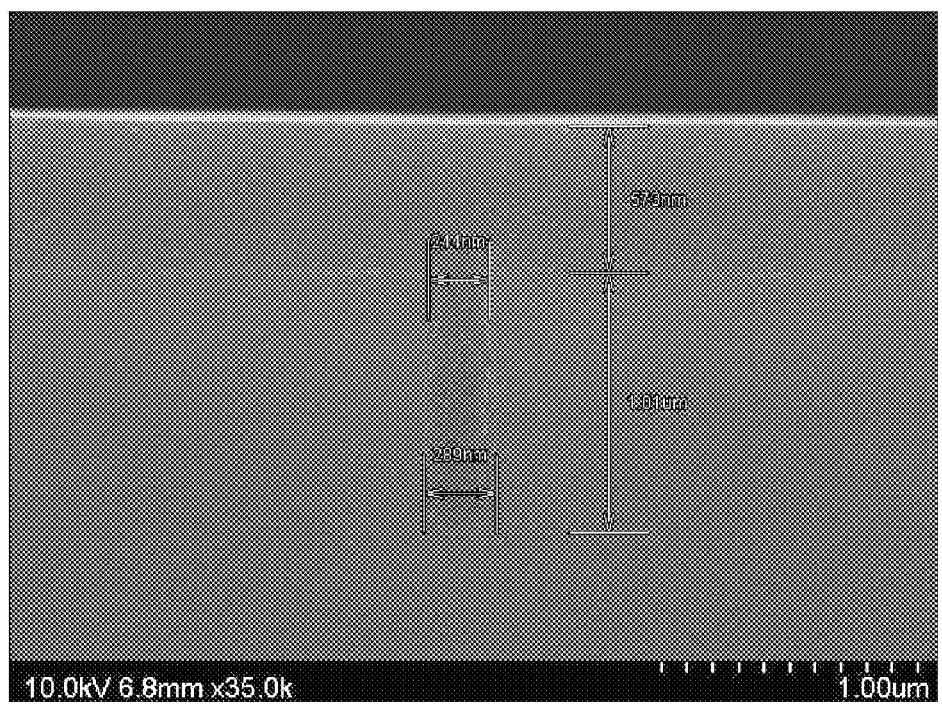
FIG. 9 shows a result of measuring gap fill property of a low-dielectric-constant thin film according to an embodiment of the present disclosure after heat treatment.

The low-dielectric-constant thin films of Examples 1 to 4 were applied on a silicon wafer by spin coating and then heat treated at 450° C. In order to evaluate coatability, the resulting film surface was observed with a scanning electron microscope (SEM). As seen from FIG. 7, all of them were coated cleanly. When surface roughness was measured using a nanoindenter microscope, a smoothly coated surface was observed at a thickness 500 nm or larger, as seen from FIG. 8. When a patterned silicon wafer was subjected to gap filling and heat treatment, it showed a surface with a superior gap fill property, as seen from FIG. 9.

Test Example 4

Chemical mechanical polishing (CMP), which is essential in a multilayer wiring structure, e.g., of a damascene type, was carried out following spin coating on a metal wiring. CMP is an important process performed for planarizing a large-area silicon wafer. If film strength or adhesivity to the metal wiring is weak, cracking or separation from the metal wiring occurs following the CMP process. All the samples prepared from the materials of the present disclosure showed excellent adhesion to metal and surface planarity before and after the CMP process.

The low-dielectric-constant thin film according to the present disclosure retains a stable film state even at a curing temperature of −500° C. without being decomposed. Also, it exhibits a very uniform surface property with a low surface modulus and has such a superior coatability as to be coatable smoothly with no crack even with a thickness of 500 nm or larger. In addition, the low-dielectric-constant thin film according to the present disclosure may exhibit low dielectric property while having superior surface modulus and hardness.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A low-dielectric-constant thin film with a low dielectric constant of 2.5 or less prepared from a silsesquioxane polymer matrix as a precursor, the silsesquioxane polymer matrix being a silsesquioxane sol prepared by adding one or more stereoisomers of a 3- to 12-membered hydroxycyclosiloxane consisting of 3 to 12 Si atoms with an organic functional group selected from a group consisting of trans, random and twist stereoisomers and a combination thereof to an alkoxysilane, wherein the trans stereoisomer is trans-cis-trans cyclosiloxane, the random stereoisomer is cis-cis-trans cyclosiloxane, and the twist stereoisomer is trans-trans-trans cyclosiloxane, and wherein the organic functional group one or more selected from a group consisting of C1-C12 n-alkyl, isoalkyl, aryl, vinyl, an n-alkyl substituted or unsubstituted aliphatic organic functional group, amine, acryl, halogen and a combination thereof.

2. The low-dielectric-constant thin film according to claim 1, wherein the alkoxysilane is methyltriethoxysilane.

3. The low-dielectric-constant thin film according to claim 1, wherein a molar ratio of the cyclosiloxane to the alkoxysilane is from 1:9 to 9:1.

4. The low-dielectric-constant thin film according to claim 1, wherein the silsesquioxane sol has a weight average molecular weight from 1,000 to 100,000.

5. A method for preparing a low-dielectric-constant thin film with a low dielectric constant of 2.5 or less, comprising:

adding a stereoisomer of one or more stereoisomers of a 3- to 12-membered hydroxycyclosiloxane consisting of 3 to 12 Si atoms with an organic functional group selected from a group consisting of trans, random and twist stereoisomers and a combination thereof to an alkoxysilane to prepare a silsesquioxane sol by a sol-gel method, wherein the trans stereoisomer is trans-cis-trans cyclosiloxane, the random stereoisomer is cis-cis-trans cyclosiloxane, and the twist stereoisomer is trans-trans-trans cyclosiloxane, and wherein the organic functional group one or more selected from a group consisting of C1-C12 n-alkyl, isoalkyl, aryl, vinyl, an n-alkyl substituted or unsubstituted aliphatic organic functional group, amine, acryl, halogen and a combination thereof;

preparing a coating solution comprising the silsesquioxane sol and a solvent; and applying the coating solution on a substrate and curing the same.

6. The method for preparing a low-dielectric-constant thin film according to claim 5, wherein the alkoxysilane is methyltriethoxysilane.

7. The method for preparing a low-dielectric-constant thin film according to claim 5, wherein the multireactive cyclosiloxane is tetramethyl-tetrahydroxy cyclotetrasiloxane.

8. The method for preparing a low-dielectric-constant thin film according to claim 5, wherein a molar ratio of the multireactive cyclosiloxane to the alkoxysilane is from 1:9 to 9:1.

9. The method for preparing a low-dielectric-constant thin film according to claim 5, which further comprises, after the preparation of the silsesquioxane sol, extracting the silsesquioxane sol using a solvent.

10. The method for preparing a low-dielectric-constant thin film according to claim 5, wherein the coating solution has a solid content of 0.1 to 80 wt % based on the total weight of the coating solution.

11. The method for preparing a low-dielectric-constant thin film according to claim 5, wherein the coating solution is applied on the substrate by spin coating.

12. The method for preparing a low-dielectric-constant thin film according to claim 5, wherein the curing is performed at room temperature (25° C.) to 750° C. for 30 minutes to 3 hours.

* * * * *